United States Patent [19]

Ringdal et al.

[11] Patent Number: 5,286,080
[45] Date of Patent: Feb. 15, 1994

[54] PLASTIC BODY ARRANGEMENT FOR SMALL, LIGHT VEHICLES

[75] Inventors: Jan O. Ringdal; Lars Ringdal, both of Oslo, Norway

[73] Assignee: A. S. Ringdal Patenter, Oslo, Norway

[21] Appl. No.: 58,664

[22] Filed: May 10, 1993

Related U.S. Application Data

[63] Continuation of Ser. No. 820,635, Jan. 28, 1992, abandoned.

[30] Foreign Application Priority Data

Aug. 4, 1989 [NO] Norway .................... 89/3155

[51] Int. Cl.$^5$ .................... B62D 29/04
[52] U.S. Cl. .................... 296/185; 296/203; 296/901; 29/428
[58] Field of Search ............ 296/901, 203, 185, 198; 29/478, 447

[56] References Cited

U.S. PATENT DOCUMENTS

| 3,023,045 | 2/1962 | Cirami | 296/901 |
|---|---|---|---|
| 3,550,948 | 12/1970 | McKinley | 296/901 |
| 4,045,075 | 8/1977 | Pulver | 296/203 |
| 4,382,626 | 5/1983 | Spooner | 296/901 |
| 4,496,188 | 1/1985 | Ezell et al. | 296/190 |
| 4,542,933 | 9/1985 | Bischoff | 296/901 X |
| 4,682,809 | 7/1987 | Huss | 296/901 |
| 4,917,435 | 4/1990 | Bonnett et al. | 296/190 |
| 5,042,395 | 8/1991 | Wackerle et al. | 105/397 |

FOREIGN PATENT DOCUMENTS

| 729881 | 1/1943 | Fed. Rep. of Germany . |
|---|---|---|
| 2056713 | 6/1972 | Fed. Rep. of Germany . |
| 3016295 | 11/1981 | Fed. Rep. of Germany . |
| 2076402 | 10/1971 | France . |
| 106481 | 2/1943 | Sweden . |
| 1315373 | 5/1973 | United Kingdom . |
| 2088792 | 6/1982 | United Kingdom . |

Primary Examiner—Robert R. Song
Attorney, Agent, or Firm—Cushman, Darby & Cushman

[57] ABSTRACT

A method for the manufacture of plastic car bodies, preferably moulded or cast in one piece, with openings for doors and windows, includes the step of forming recesses from the outside to the inside terminating inside in an approximately right angle; at least one opening is cut out by means of a projection from a flange or angle K; moulding is then secured to envelop the plastic portion and is attached to an internal rollover bracket or frame; on one side of the door opening moulding is secured a door hinge.

16 Claims, 1 Drawing Sheet

PLASTIC BODY ARRANGEMENT FOR SMALL, LIGHT VEHICLES

This is a continuation of application Ser. No. 07/820,635, filed on Jan. 28, 1992, which was abandoned upon the filing hereof.

BACKGROUND OF THE INVENTION

1. Field of the Invention

The present invention relates to an arrangement of and a method for the production of bodies/cabins for lightweight vehicles, by which the bodies/cabins are moulded/casted/blow moulded, mainly with floor, sidewall and roof in one piece, by means of floating/spot-free devices for securing/fixing the cabin to the vehicle's roll-over safety bars and floor frame/chassis.

2. Description of Related Art

For the building of car bodies/cabins, it has been normal to use a metal frame with plates welded on as bodywork. This is possible when the plates and the framework are both metallic. Building bodies/cabins with glass-fibre reinforced Polyester has been tried, but it proves to be extremely work-intensive. It necessitates a substantial amount of handwork, being built up in layers and thus making the bodies expensive. In addition, the fixing between a metal framework and the plastic bodyparts by screws or rivets creates local stresses.

Metal bodies have therefore more or less controlled the market, but these are heavy and have disadvantages such as corrosion and the like. Comprehensive galvanization and paint treatment have been necessary, but the problems still exist. Another drawback is that the bodies are getting very heavy, which has impeded the development of small, lightweight vehicles.

SUMMARY OF THE INVENTION

The object of the invention is to make it possible to produce small, light vehicles, without the above mentioned disadvantages.

This is achieved by an arrangement by such vehicles and a method for producing such vehicles as described in the claims.

DETAILED DESCRIPTION OF THE PREFERRED EMBODIMENTS

This invention has made it possible to produce the car/vehicle body/cabin by, for example vacuum moulding, blow moulding and rotational moulding, mainly with floor, roof and sidewalls in one piece. In the case of rotational moulding, four moulds and a cycle of 1 hour is used, the moulding time for each body will be approximately 15 minutes. By using coloured plastics, no further surface handling is needed, and if the body suffers a blow, it will sustain few visible "scratches" or dents. The elastic plastic material will also be more gentle on the passengers in case of a crash.

According to the invention, in the production mould, recesses are made from the outside to the inside for doors and windows. The recesses terminate at their innermost point in an approximately 90° angle, and the openings are cut out so that a projection remains. Cutouts are made for windows and doors after the body has been moulded.

To make the body lightweight and as safe as possible, it is assumed according to the invention, that one uses internal roll-over safety bars and a metallic floor frame/chassis, preferably of aluminium. Plastic and aluminium have different degrees of temperature expansion, and according to the invention the body is fixed in a flexible manner to the rollover bars that are secured to the floor frame/chassis.

At least two of the roll-over bars are fastened to the floor frame, one on each side of the door opening, and they are covered by the body's/cabin's plastic on at least two sides.

Profiles envelope and fix the rest of the plastic angle after the opening for doors/windows have been cut out; they direct and press the plastic against the roll-over bars when the profile is firmly fixed; screwed or riveted. This also provides a stable flange for doors and windows. This allows the plastic and the metal framework to move in various ways in varying temperatures. Fatigue fractures will therefore not arise at local fixing spots.

According to the invention the above mentioned profiles are also used to secure the weatherstrip/gaskets around the doors and windows. It is assumed that these opening shall not have sharp-angled corners, but preferably rounded ones with a radius of 20 mm or more. The profiles are, according to the invention, also intended to cover the plastic edges resulting from the cutting out of openings for doors and windows.

As mentioned above, the invention is intended to be used for light-weight bodies/cabins and it assumes therefore that the side door is combined with the window. Preferably, the whole door should be made of an impact-resistant, transparent plastic.

The internal roll-over safety bars curve toward the ceiling and have a greater radius than that of the adjacent part of the plastic body/cabin. This means that it allows for varying expansions and shrinkage of the plastic and metal parts when temperatures change.

Figure 1:
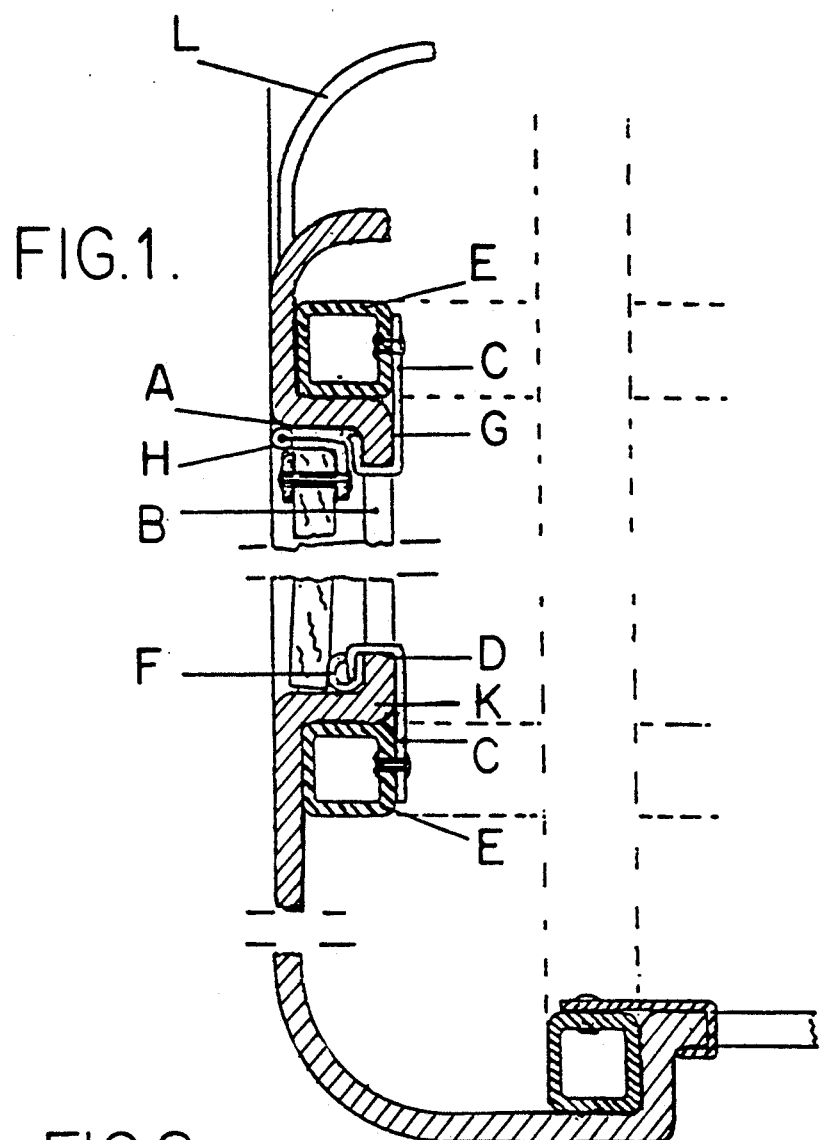
FIG. 1 is a cross-sectional view, taken along lines 1—1 of FIG. 2, of a small light vehicle according to an embodiment of the present invention.
Figure 2:
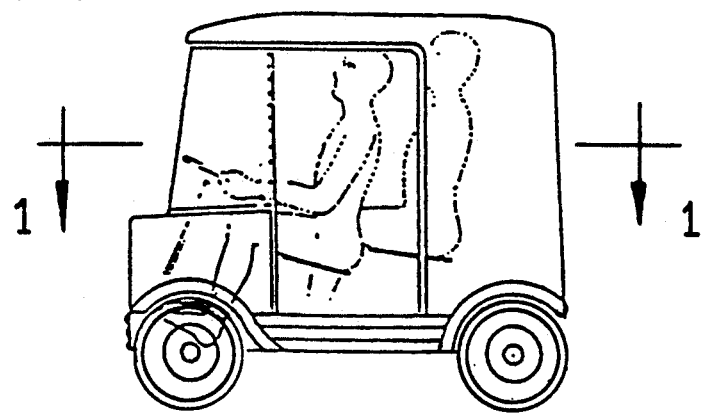
FIG. 2 is a side view of a small, light vehicle according to an embodiment of the present invention.

The invention can be produced in various ways, and FIG. 1 shows one means of production, where A shows the body/cabin part with a recessed are K for the door opening. B shows the cut out door opening, with the cut edge forming an end projection D a slight distance from an angular portion K innermost in the recessed area. A profile C envelopes the remaining end of the angular portion K and the end protection D, and fastens the body/cabin A floatingly to the roll-over bars/framework E, which can be round or square. The profile C can be fixed to the roll-over bars/framework E by e.g. means of screws or rivets. The profile C has an extention on the side of the door and window intended for hinges G, for fastening the hinges. The profile C is also used to fasten a weatherstrip/gasket F around the door and windows. The windscreen L can likewise overlap the roll-over bars/framework E at the back and is secured by the profile C.

We claim:

1. A light weight body for a vehicle of the type having a roll-over safety bar framework mounted on a floor frame, comprising:

said body including a floor and sidewalls extending from said floor;

a plurality of recesses located within said sidewalls, each of said recesses having an end projection and a door or window opening; and a plurality of fixing means for connecting said body to said roll-over safety bar framework, each of said fixing means having a first end and a second end, wherein said first end of each of said fixing means is provided around an end projection of a recess and said second end of each of said fixing means is fixed to said roll-over safety bar framework inside said body, so as to slidably connect said body to said roll-over safety bar framework.

2. A light weight body according to claim 1, wherein said body is formed of plastic.

3. A light weight body according to claim 1, wherein said recesses have an inward curve of approximately 90° from said body.

4. A light weight body according to claim 1, further comprising a plurality of weatherstrips, said plurality of weatherstrips being connected to said body by a plurality of said fixing means.

5. A light weight body according to claim 1, wherein each of said fixing means comprises a hinge.

6. A light weight body according to claim 1, further comprising a front screen with an inward curving profile, said front screen being connected to said roll-over safety bar framework by a plurality of said fixing means.

7. A method of the manufacture of light weight bodies for vehicles of the type having a roll-over safety bar framework mounted on a floor frame, comprising:

molding a body so that said body is formed with a plurality of recesses; and cutting out window or door openings from each of said recesses so as to provide an end projection within each of said recesses and to allow said body to be slidably connected to said roll-over safety bar framework.

8. A method of manufacture of light weight bodies according to claim 7, whereby each of said recesses is formed so as to have an inward curve of approximately 90° from said body.

9. A method of manufacture of light weight bodies according to claim 7, characterized in that said body is shaped with said floor, said sidewalls, and said roof as one piece, through rotational molding.

10. A method of manufacture of light weight bodies according to claim 7, characterized in that said body is formed with said floor, said sidewalls and said roof as one piece, through blow molding.

11. A method of the assembly of vehicles of the type having a light weight body and a roll-over safety bar framework mounted on a floor frame, comprising:

supplying a light weight body having a floor, a roof, sidewalls between said floor and said roof, a plurality of recesses each having an inward curve of approximately 90° from said body within said sidewalls, and an end projection and a door or window opening within each of said plurality or recesses;

positioning said roll-over safety bar framework behind said plurality of recesses; and slidably connecting said body to said roll-over safety bar framework through the use of a plurality of fixing profiles.

12. A method of the assembly of vehicles according to claim 11, whereby one roll-over safety bar is laterally positioned on each side of each of said recesses in such a manner that each roll-over safety bar is adjacent to and at least partially covered by said body and said inward curve of said recess.

13. A method of the assembly of vehicles according to claim 11, whereby said plurality of fixing profiles form covers for said end projections of said plurality of recesses.

14. A method of the assembly of vehicles according to claim 11, whereby said plurality of fixing profiles also connect a plurality of weather strips to said body.

15. A method of the assembly of vehicles according to claim 11, whereby a portion of each of said fixing profiles forms a hinge.

16. A method of the assembly of vehicles according to claim 11, further comprising fastening a front screen having an inward curving profile to said roll-over safety bar framework through the use of said fixing profiles.

* * * * *